US006864097B1

(12) United States Patent
Schembri et al.

(10) Patent No.: US 6,864,097 B1
(45) Date of Patent: Mar. 8, 2005

(54) ARRAYS AND THEIR READING

(75) Inventors: Carol T. Schembri, San Mateo, CA (US); Kimberly L. Tam, Daly City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 550 days.

(21) Appl. No.: 09/671,966

(22) Filed: Sep. 27, 2000

(51) Int. Cl.[7] .................................................. G01N 21/01

(52) U.S. Cl. .......................................... 436/165; 436/46

(58) Field of Search ............................ 436/46, 94, 164, 436/165, 174, 527

(56) References Cited

U.S. PATENT DOCUMENTS

| | | | | |
|---|---|---|---|---|
| 5,578,832 A | * | 11/1996 | Trulson et al. | 250/458.1 |
| 5,675,443 A | | 10/1997 | Dorsel | |
| 5,763,870 A | | 6/1998 | Sadler et al. | |
| 5,945,679 A | | 8/1999 | Dorsel et al. | |
| 5,959,098 A | | 9/1999 | Goldberg et al. | |
| 5,968,728 A | | 10/1999 | Perttunen et al. | |
| 6,140,044 A | * | 10/2000 | Besemer et al. | 435/6 |
| 6,177,990 B1 | | 1/2001 | Kain et al. | |
| 6,180,351 B1 | | 1/2001 | Cattell | |
| 6,215,894 B1 | | 4/2001 | Zeleny et al. | |
| 6,238,862 B1 | | 5/2001 | McGall et al. | |
| 6,251,601 B1 | * | 6/2001 | Bao et al. | 435/6 |
| 6,395,554 B1 | * | 5/2002 | Regan et al. | 436/46 |

FOREIGN PATENT DOCUMENTS

| | | | |
|---|---|---|---|
| EP | 0695941 A2 | * | 2/1996 |

* cited by examiner

*Primary Examiner*—Jeffrey R. Snay
(74) *Attorney, Agent, or Firm*—Gordon M. Stewart

(57) ABSTRACT

A method of reading an array of moieties such as polynucleotides (for example, DNA) on at least a portion of a surface of a transparent slide which is opposite a first portion on the opposing surface, which array has been previously exposed to a sample. The method may include mounting the slide on a slide holder and retaining the slide thereon in a mounted position in which the holder does not contact the previously exposed array. The holder is then inserted into an array reader and the array read. A holder and slides which can be used in the method are also provided.

3 Claims, 5 Drawing Sheets

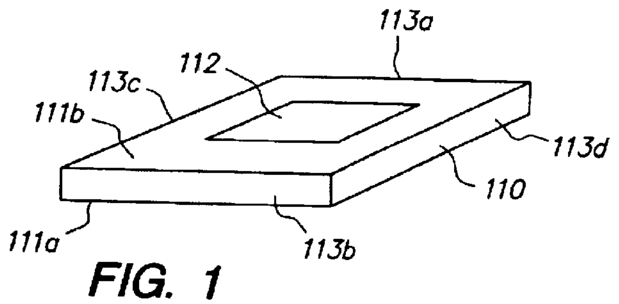
FIG. 1
FIG. 2
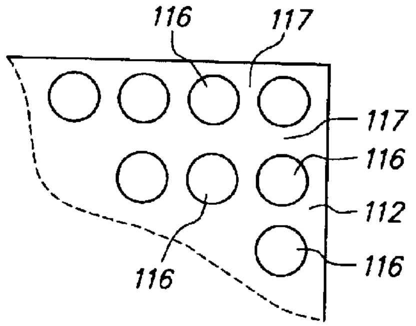
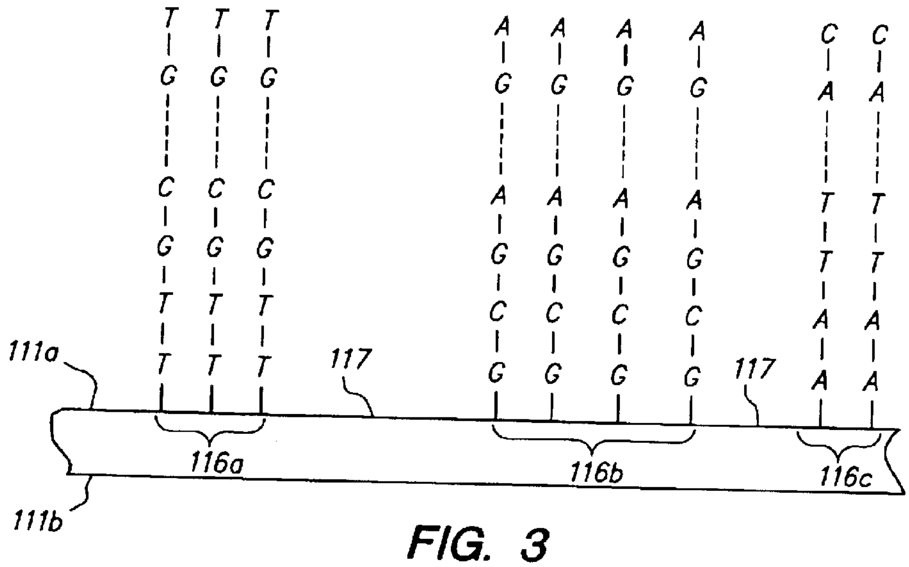
FIG. 3

ARRAYS AND THEIR READING

FIELD OF THE INVENTION

This invention relates to slides holding multiple moieties to be read, and in particular to arrays such as polynucleotide arrays (for example, DNA arrays), which are useful in diagnostic, screening, gene expression analysis, and other applications.

BACKGROUND OF THE INVENTION

Polynucleotide arrays (such as DNA or RNA arrays), are known and are used, for example, as diagnostic or screening tools. Such arrays include regions of usually different sequence polynucleotides arranged in a predetermined configuration on a substrate. These regions (sometimes referenced as "features") are positioned at respective locations ("addresses") on the substrate. In use, the arrays, when exposed to a sample, will exhibit an observed binding or hybridization pattern. This binding pattern can be detected upon interrogating the array. For example, all polynucleotide targets (for example, DNA) in the sample can be labeled with a suitable label (such as a fluorescent dye), and the fluorescence pattern on the array accurately observed following exposure to the sample. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated by depositing previously obtained biopolymers (such as from synthesis or natural sources) onto a substrate, or by in situ synthesis methods. Methods of depositing obtained biopolymers include dispensing droplets to a substrate from dispensers such as pin or capillaries (such as described in U.S. Pat. No. 5,807,522) or such as pulse jets (such as a piezoelectric inkjet head, as described in PCT publications WO 95/25116 and WO 98/41531, and elsewhere). For in situ fabrication methods, multiple different reagent droplets are deposited from drop dispensers at a given target location in order to form the final feature (hence a probe of the feature is synthesized on the array stubstrate). The in situ fabrication methods include those described in U.S. Pat. No. 5,449,754 for synthesizing peptide arrays, and described in WO 98/41531 and the references cited therein for polynucleotides. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura et al., *Ann. Rev. Biochem.* 53: 323–356; Hunkapillar et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, U.S. Pat. No. 5,153,319, U.S. Pat. No. 5,869,643, EP 0294196, and elsewhere Polynucleotide arrays have previously been provided in two formats. In one format, the array is provided as part of a package in which the array itself is disposed on a first side of a glass or other transparent substrate. This substrate is fixed (such as by adhesive) to a housing with the array facing the interior of a chamber formed between the substrate and housing. An inlet and outlet may be provided to introduce and remove sample and wash liquids to and from the chamber during use of the array. The entire package may then be inserted into a laser scanner, and the sample exposed array may be read through a second side of the substrate.

In another format, the array is present on an unmounted glass or other transparent slide substrate. This array is then exposed to a sample optionally using a temporary housing to form a chamber with the array substrate. The slide may then be placed in a laser scanner to read the exposed array. Most slide scanners require that the user manually insert the slide into a holder within the scanner. Some scanners allow the slide to rest on a surface while others clamp it to a known location using various types of guides. The present invention realizes that this technique creates a number of potential problems. First, since the array itself is unprotected it is subject to damage. Any damage is extremely undesirable for a number of reasons. For example, slight damage, such as fingerprints or scratches may occur to the sample exposed array which is not noticed. Such damage could lead to incorrect readings with serious consequences in interpretation of results. Also, it is not uncommon for the slides to be broken during insertion or removal from these scanners. Slide glass is easily chipped or broken. Losing a slide at this stage of the experiment can be extremely costly. Typically, the arrayed slides cost several hundred dollars and may involve long lead times. The samples under test may be from tumors or other hard-to-obtain sources. The fluorescent dyes typically employed are currently quite expensive. Therefore, a broken slide represents the loss of many hundreds of dollars and many hours of work. Thus, the present invention realizes that it is preferred to have a safer method and means of handling these slides. Furthermore, given that the individual features within the arrays on the surface of such slides are on the order of 10 to 120 microns in size and the importance of gathering all possible fluorescent signal, it is desirable to reference and hold these slides precisely. However, the present invention further realizes that precision placement usually involves firm surfaces and forcibly clamping the slides, which actions can result in slide breakage or array damage. If the slide is simply placed into a chamber to avoid clamping, large positional tolerances are needed which reduce the detection quality of the signals from the surface. Gathering all possible fluorescent signal from each feature on the array also requires that other sources of noise are minimized.

It would be desirable then to provide a means which could protect moieties, such as an exposed array, carried on a slide and protect the slide itself from breakage, which is relatively easy to use without requiring extensive manipulations of the slide, and which can aid in precisely positioning the slide (and hence the moieties) in a reader for reading of the exposed array.

SUMMARY OF THE INVENTION

The present invention then, provides in one aspect, a method of reading an array of moieties on at least a portion of a surface of a transparent slide which is opposite a first portion on an opposite surface, which array has been previously exposed to a sample. The method includes mounting the slide on a slide holder and retaining the slide thereon in a mounted position without the array contacting the holder. The holder is then inserted into an array reader and the array read. In one embodiment of the method, the moieties may be on at least a portion of a rear surface of a transparent slide which is opposite a first portion on the front surface, which array has been previously exposed to a sample. In this embodiment the slide when in the mounted position has the exposed array facing a backer member of the holder without the array contacting the holder. The backer member is preferably has a very low in intrinsic fluoresence or is located far enough from the array to render any such fluroesence insignificant. In either situation, the backer member contributes less than 20% or 10%, and preferably less than 5% or less than 1% or 0.5% (or even less than 0.1%) to the strongest signal which can be obtained from a region (such as a feature) on the slide.

Optionally, the array may be read through the front side of the slide. The reading, for example, may include directing a light beam through the slide from the front side and onto the array on the rear side, and detecting a resulting signal from the array which has passed from the rear side through the slide and out the slide front side. The holder may further include front and rear clamp sets which can be moved apart to receive the slide between the sets. In this case, the slide is retained in the mounted position by the clamp sets being urged (such as resiliently, for example by one or more springs) against portions of the front and rear surfaces, respectively. The clamp sets may, for example, be urged against the slide front and rear surfaces of a mounted slide at positions adjacent a periphery of that slide. Alternatively, the array may be read on the front side when the slide is positioned in the holder with the array facing forward (that is, away from the holder).

The holder may in one embodiment have a body with side portions and a channel intermediate the side portions, which channel extends in a direction between ends of the body. In this case, the backer member may be a bottom surface of the channel. In such a configuration, the front and rear clamp member sets may have their members disposed about the channel, and one of those sets may have its members fixed to the body side portions while the other set is movable to an open position away from the fixed set. For example, the front clamp member set may be fixed to the body side portions and the rear clamp member set may be movable. In this case, the slide is retained in the mounted position by being urged against the fixed clamp member set.

The method may use a holder with a control member set positioned on an accessible location on the holder, for example at a position outside the channel, which control member set is moved to move the movable clamp set to the open position. In the case where the movable clamp set is the rear clamp member set, the control member may simply be moved rearward to move the rear clamp member set to the open position.

In the holder configuration where the body has the channel as described above, the slide may be mounted on the holder by sliding the slide in an endways direction of the channel and into the mounted position in which a leading end of the slide abuts the closed end of the channel. Clamp member sets positioned about the channel, may be held in the open position during such a mounting procedure (for example, by the control member set rearward).

The holder used in the method may additionally have two spaced apart guides extending from the body adjacent respective sides of the channel. With this configuration the slide may be slid into the mounted position along the guides, the guides being dimensioned such that when the slide is in the mounted position a trailing end of the slide is positioned between the guides. During any mounting of the slide portions of the slide, portions of the slide front and rear surfaces may be gripped (such as with a user's fingers) and the gripped portions used to then slide the slide into the mounted position. The guides, in such case may be dimensioned such that the gripped portions are positioned between the guides when the slide is in the mounted position. The method may optionally additionally include removing the slide from the mounted position, which removing includes gripping portions of the slide front and rear surfaces which are between the guides and using the gripped portions to slide the slide in an endways direction opposite to that in which the slide was slid during the slide mounting.

The present invention also provides a holder for a slide, which holder has any of the features already described above. In one embodiment, the holder may include a backer member and the clamp sets as described above. The clamp members may be positioned such that the holder can receive and retain a slide having an area of no more than 200 $cm^2$ (or no more than 100 $cm^2$ or even no more than 50 or 40 $cm^2$). The holder may also be dimensioned such that the moieties on the rear side of the mounted slide are spaced from the backer member by between 0.1 mm to 10 mm (or more preferably between 0.5 and 5 or 3 mm). The holder itself may have various shapes, for example, rectangular. In one aspect, the holder will have a maximum area of a side which is no more than 300 $cm^2$ (or preferably no more than 200 $cm^2$ or 100 $cm^2$). When a channel is present in the holder it may, for example, be no wider than 20 $cm^2$ (or no wider than 15 $cm^2$, 10 $cm^2$, or 5 $cm^2$).

The present invention further provides a transparent slide having opposed front and rear surfaces, the slide carrying moieties such as an array of biopolymers on a rear surface, and an identification code on a front surface. The identification code may, for example, be a bar code, which is printed on an opaque label attached to the front side of the slide. A method of reading an array on such a slide is also provided, where the array is read through the front surface and the identification code is read from a front side.

Alternatively, as mentioned above, the holder may be used with an array of the mounted slide located on the a forward facing surface (that is, away from the holder). While the surface protection benefit is lost in this configuration, the benefits of ease of handling and physical protection of the slide are retained. One may wish to read the array on a forward facing side of the slide to allow for various opaque slides, mirrored slides or to avoid the issues of thickness variations in transparent slides (that is, arrays on a backward facing surface of a slide which are read through the slide from the front side, may be on different focal planes of the scanner in the case where the thicknesses of the transparent slide vary).

Different embodiments of methods and devices of the present invention can provide any or more of a number of useful features. For example, moieties on the slide (such as the exposed array) can be protected from damage and the slide itself protected from breakage. Background signals during array reading may be reduced by the use of the backer member. Further, it may be relatively easy to use devices of the present invention and extensive manipulations of the slide may be avoided, while relatively precise positioning of the slide (and hence the moieties) in a reader may be obtained for assisting in the reading of the exposed array.

BRIEF DESCRIPTION OF THE DRAWINGS

Embodiments of the invention will now be described with reference to the drawings, in which:

FIG. 1 illustrates a slide carrying an array, of the present invention, and such as may be used in a holder and methods of the present invention;

FIG. 2 is an enlarged view of a portion of FIG. 1 showing ideal spots or features;

FIG. 3 is an enlarged illustration of a portion of the substrate in FIG. 2;

To facilitate understanding, identical reference numerals have been used, where practical, to designate identical elements that are common to the figures.

DETAILED DESCRIPTION OF EMBODIMENTS OF THE INVENTION

Figure 4:
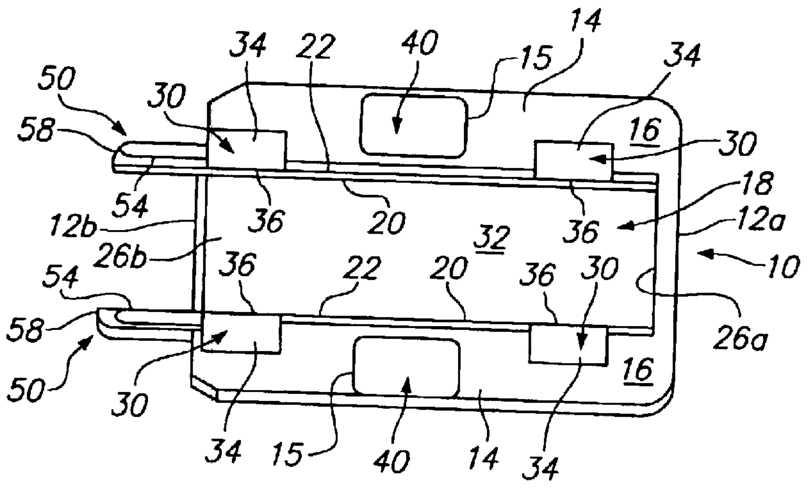
FIG. 4 is a front view of a holder of the present invention.
Figure 5:
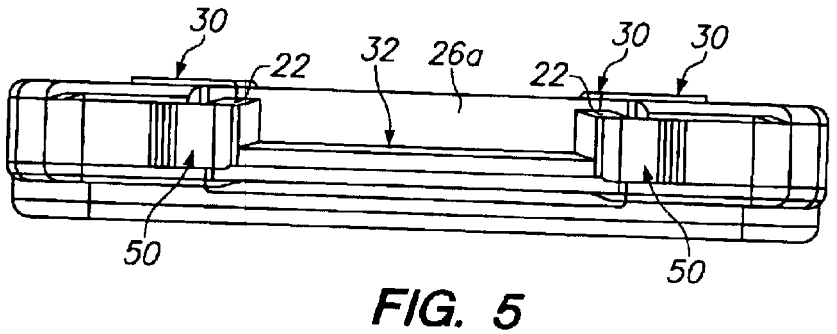
FIG. 5 is a leading end elevation of the holder of FIG. 1.
Figure 6:
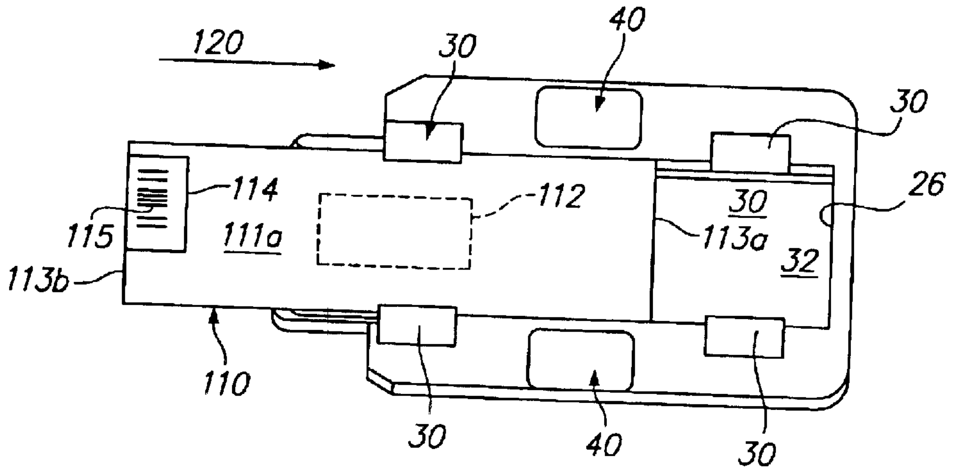
FIG. 6 is a view the same as that of FIG. 4 but showing a slide of FIG. 1 being slid into the mounted position on the holder.

In the present application, unless a contrary intention appears, the following terms refer to the indicated characteristics. A "biopolymer" is a polymer of one or more types of repeating units. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A "peptide" is used to refer to an amino acid multimer of any length (for example, more than 10, 10 to 100, or more amino acid units). A biomonomer fluid or biopolymer fluid reference a liquid containing either a biomonomer or biopolymer, respectively (typically in solution).

A "set" or "sub-set" of any item (for example, a set of features) may contain one or more than one of the item (for example, a set of clamp members may contain one or more such members). An "array", unless a contrary intention appears, includes any one, two or three dimensional arrangement of addressable regions bearing a particular chemical moiety or moieties (for example, biopolymers such as polynucleotide sequences) associated with that region. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). An "array layout" refers collectively to one or more characteristics of the features, such as feature positioning, one or more feature dimensions, and some indication of a moiety at a given location. "Hybridizing" and "binding", with respect to polynucleotides, are used interchangeably. When one item is indicated as being "remote" from another, this is referenced that the two items are at least in different buildings, and may be at least one mile, ten miles, or at least one hundred miles apart.

It will also be appreciated that throughout the present application, that words such as "front", "rear", "back", "leading", "trailing", "top", "upper", and "lower", are all used in a relative sense only. "fluid" is used herein to reference a liquid. Reference to a singular item, includes the possibility that there are plural of the same items present. Furthermore, when one thing is "slid" or "moved" or the like, with respect to another, this implies relative motion only such that either thing or both might actually be moved in relation to the other. All patents and other cited references are incorporated into this application by reference.

Referring first to FIGS. 1–3, typically methods and apparatus of the present invention generate or use a contiguous planar transparent slide 110 carrying an array 112 disposed on a rear surface 111*b* of substrate 110. It will be appreciated though, that more than one array (any of which are the same or different) may be present on rear surface 111*b*, with or without spacing between such arrays. Note that one or more arrays 112 together will only cover a portion of the rear surface 111*b*, with regions of the rear surface 111*b* adjacent the opposed sides 113*c*, 113*d* and leading end 113*a* and trailing end 113*b* of slide 110, not being covered by any array 112. A front surface 111*a* of the slide 110 does not carry any arrays 112. Each array 112 can be designed for testing against any type of sample, whether a trial sample, reference sample, a combination of them, or a known mixture of polynucleotides (in which latter case the arrays may be composed of features carrying unknown sequences to be evaluated). Slide 110 may be of any shape, and any holder used with it adapted accordingly, although slide 110 will typically be rectangular in practice. Array 112 contains multiple spots or features 116 of biopolymers in the form of polynucleotides. A typical array may contain from more than ten, more than one hundred, more than one thousand or ten thousand features, or even more than from one hundred thousand features. All of the features 116 may be different, or some or all could be the same. In the case where array 112 is formed by the conventional in situ or deposition of previously obtained moieties, as described above, by depositing for each feature at least one droplet of reagent such as by using a pulse jet such as an inkjet type head, interfeature areas 117 will typically be present which do not carry any polynucleotide. It will be appreciated though, that the interfeature areas 117 could be of various sizes and configurations. Each feature carries a predetermined polynucleotide (which includes the possibility of mixtures of polynucleotides). As per usual, A, C, G, T represent the usual nucleotides. It will be understood that there may be a linker molecule (not shown) of any known types between the rear surface 111*b* and the first nucleotide. However, as mentioned above, the array 112 may optionally be on the front surface 111*a*.

Slide 110 also carries on front surface 110*a*, an identification code in the form of bar code 115 printed on an opaque substrate in the form of a paper label attached by adhesive to front side 110*a*. By "opaque" in this context is referenced that the means used to read bar code 115 (typically a laser beam) cannot read code 115 through the label without reading errors. Typically this means that less than 60% or even less than 50%, 30%, 20% or 10% of the signal from the code passes through the substrate. Bar code 115 contains an identification of array 112 and either contains or is associated with, array layout or layout error information in a manner such as described in U.S. patent application Ser. No. 09/302,898 (filed Apr. 30, 1999) and Ser. No. 09/359,536 (filed Jul. 22, 1999) both originally assigned to Hewlett-Packard, incorporated herein by reference.

For the purposes of the discussions below, it will be assumed (unless the contrary is indicated) that the array 112 is a polynucleotide array formed by the deposition of previously obtained polynucleotides using pulse jet deposition units. However, it will be appreciated that an array of other polymers or chemical moieties generally, whether formed by multiple cycle in situ methods adding one or more monomers per cycle, or deposition of previously obtained moieties, or by other methods, may be present instead.

Turning now to FIGS. 4–7, a holder 10 of the present invention will now be described in more detail. Holder 10 has a body which is generally rectangular in shape and includes two opposed side portions 14 with a channel 18 positioned therebetween, and extending in a direction between ends 12*a*, 12*b* of the body. Channel 18 has a bottom surface 32 which acts as a backer member, and has a closed leading end 26 and an open trailing end 26*b*. Opposed sides 20 of channel 18 have ledges 22 running the length of the sides 20. Portions of ledges 22 act as a movable set of rear clamp members, as will shortly be described. Four tabs 30 positioned about channel 18, have outside portions 34 attached to side portions 14 and inside portions 36 which extend over ledges 22 and are slightly spaced therefrom in a normal position of ledges 22. Inside portions 36 act as a front set of fixed clamp members which are fixed to side portions 14. Positioned outside channel 18 on a front side of holder 10, is a control member set consisting of two control members in the form of buttons 40 each of which is positioned and movable within an opening 15 in a front surface 16 of a corresponding side portion 14. Each control member is connected to channel 18 (including ledges 22) such that moving the control members rearward (into the page, as viewed in FIG. 4) causes the channel 18 to also move rearward, thereby moving ledges 18 (portions of which, beneath inside portions 36 of tabs 30, act as the rear clamp member set) away from portions 36 of tabs 30 (which act as the fixed front clamp member set) to an open position. That is, pressing down on buttons 40 (as viewed in FIG. 4) moves the clamp member sets to an open position. Four springs 72 (seen in FIG. 9) resiliently urge the channel 18 and hence ledges 22 forward toward one another (thereby urging the rear clamp member, composed of portions of ledges 22, to the normal position).

Two spaced apart guides 50 extend from a trailing end of the holder body adjacent respective sides of channel 18. Each guide includes a trailing end 50 and a ledge 54 approximately aligned with a corresponding ledge 22 when the set of ledges 22 (rear clamp member set) is in the open position.

Figure 7:
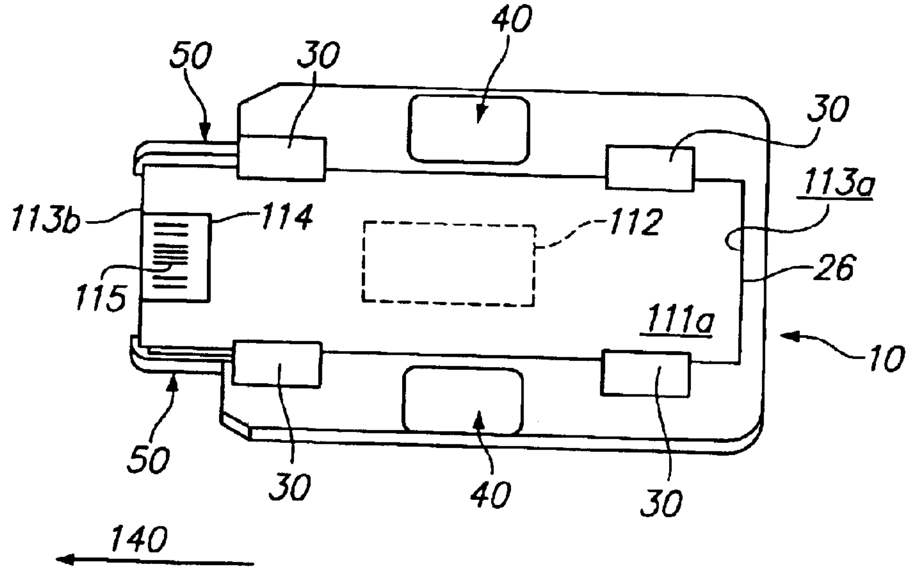
FIG. 7 is the same as FIG. 6 but showing the slide in the mounted position on the holder.
Figure 8:
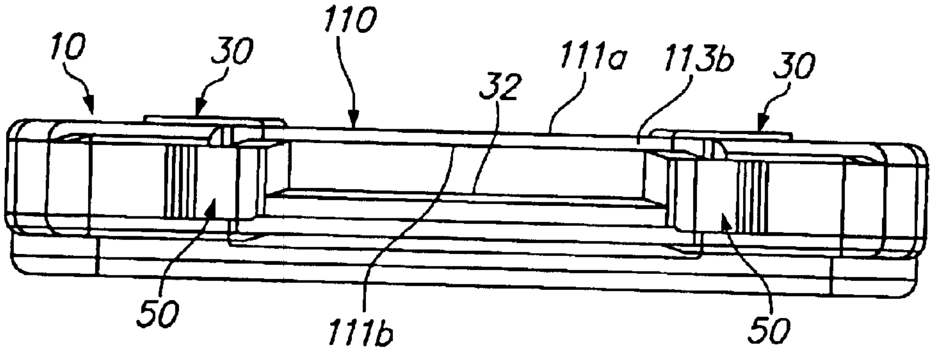
FIG. 8 is a leading end elevation of the holder with mounted slide.

The holder as described, is used to mount slide 110 in a manner as will now be described. First, the array 112 will have typically been previously exposed to a fluid sample which is to be tested for moieties (such as polynucleotides) which may bind (for example, hybridize) to the moieties (such as polynucleotides) at one or more features. The moieties to be tested may be labeled with fluorescent dyes in a known manner. The array 112 may then be washed and dried in preparation for reading. At this point a user will typically grip opposing portions of the front and rear surfaces of slide 110 toward the trailing end 113*b* using their thumb and forefinger. Buttons 40 can then be pressed rearward (into the page as viewed in FIG. 4) to move channel 18 and attached ledges 22 rearward thereby moving the clamp member sets to the open position. Note that when in the open position, the distance between the ledges 22 (movable rear clamp member set) and portions 36 (fixed front clamp member set) is greater than the thickness of slide 110. Leading edge 113*a* of slide 110 can then be positioned between guides 50 with opposite edges of slide 110 resting on ledges 54 of guides 50, with rear surface 111*b* (and hence array 112) facing rearward) and bar code 115 facing forward. Slide 110 can then be slid using the gripped portions in an endways direction 120 (see FIG. 6) along ledges 54 of guides 50 and then along ledges 22 of channel 18, between the open clamp member sets, until leading edge 113*a* of slide 110 abuts leading edge 26 of channel 18 at which point slide 110 is in the mounted position (as shown in FIGS. 7 and 8).

Slide 110 is retained in the mounted position by releasing buttons 40. Springs 72 then urge ledges 22 (rear clamp member sets) against portions 36 (front clamp member sets), the urging of the clamp member sets against side edge portions of slide 110 causing the slide 110 to be retained in the mounted position. Since the rear movable clamp member set urges slide 110 against the fixed front clamp member set, this helps ensure that array 112 is in a known fixed position relative to the holder for reading of the array. Note that when in the mounted position, rear surface 111*b* (and hence array 112) is spaced apart from bottom surface 32 (which acts as the backer member). Note also that when slide 110 is in the mounted position, the clamp members, and any other portion of the holder, do not contact array 112 or a portion of front surface 111*a* which is opposite array 112. Also, when the slide 110 is in the mounted position, trailing end 113*b* is positioned between guides 50. This helps protect trailing end 113*b* from breakage. Furthermore, the gripped position will be between guides 50. The fact that guides 50 extend away from the remainder of the holder such that there are no surfaces or members between guides 50, allows a user to continue to maintain a hold on the gripped portions of the slide 110 until it is in the mounted position at which point the gripped portions will also be between guides 50. The array 112 of the mounted slide is spaced apart from surface 32 (backer member). This allows backer member 32 to protect array 112 of the mounted slide, while the spacing between backer member 32 and array 112 maintains backer member out of the plane of focus of a reader (which will focus on the plane in which array 112 lies on the rear surface 111*b*). This reduces the detection of any fluorescence which might occur from the backer member in response to an interrogating light.

Figure 11:
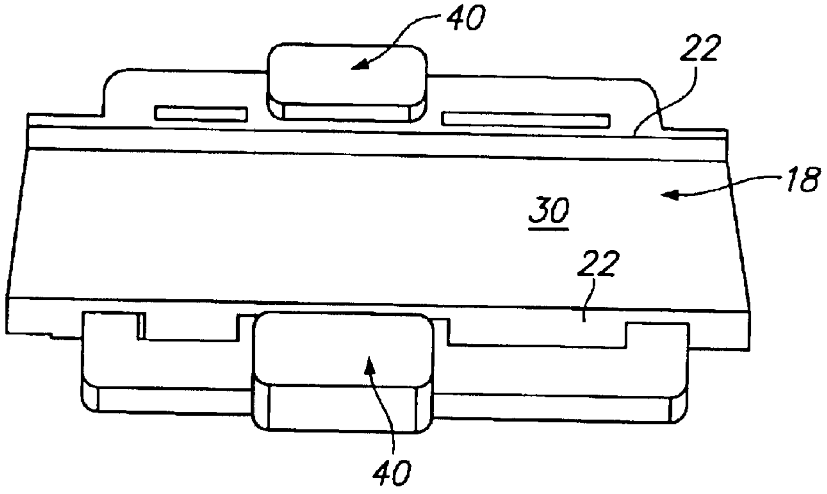
Figure 12:
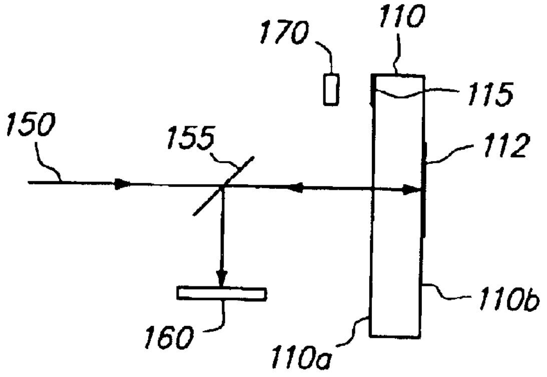
FIG. 12 illustrates scanning of a slide mounted in the holder of FIG. 1.

The holder 10 with mounted slide may then be inserted into a reader, such as a laser scanner, which has a suitable mounting means for receiving and releasably retaining the holder in a known position. The scanner should be able to read the location and intensity of fluorescence at each feature of an array following exposure to a fluorescently labeled sample (such as a polynucleotide containing sample). For example, such a scanner may be similar to the GENEARRAY scanner available from Agilent Technologies, Inc., Palo Alto, Calif. The array 12 may then be read through front side 110*a* of slide 110 in a manner illustrated in FIG. 11. In particular, a scanning interrogating laser beam 150 is directed through a beam splitter 155 and then through front side 110*a* and scanned across array 12. Resulting fluorescent signals from the array which have passed back through slide 110 and out through front side 110*a* may then be detected at detector 160. Results from the interrogation can be processed such as by rejecting a reading for a feature which is below a predetermined threshold and/or forming conclusions based on the pattern read from the array (such as whether or not a particular target sequence may have been present in the sample). The results of the interrogation or processing can be forwarded (such as by communication) to a remote location if desired, for further use. The bar code 115 is read from the front side of slide 110 by bar code reader 170. Information from the read bar code 115 can be used to retrieve array layout information which can be used in the reading and/or processing of the interrogation results, in a manner as described in U.S. patent application Ser. No. 09/302,898 (filed Apr. 30, 1999) and Ser. No. 09/359,536 (filed Jul. 22, 1999), both originally assigned to Hewlett Packard and incorporated herein by reference.

After the reading of array 112 is complete, the holder may be removed from the scanner. A user may now remove slide 110 for storage or disposal. To remove the slide from the mounted position, the user depresses the two buttons 40 on the slide holder to open the clamp member set, and grips opposite portions of the front and back surfaces of slide 110 at positions between guides 50. The gripped portions may then be used to slide the slide out of holder 10 in an endways direction 140 opposite that of direction 120.

As previously mentioned though, the slide can be mounted with the array 112 facing forward. For example, the slide is mounted as shown in the FIGS. 6 through 8 but array 112 is on the front side 111*a* of slide 110. Such a forward facing slide can be read directly from the front side without the signal from the array having to pass through the slide (as it does in the arrangment described in connection with FIGS. 6–8 and 12). In such a case, the bar code may be on the front or rear side of slide 110 and bar code reader 170 can be positioned to read bar code 115 accordingly.

Figure 9:
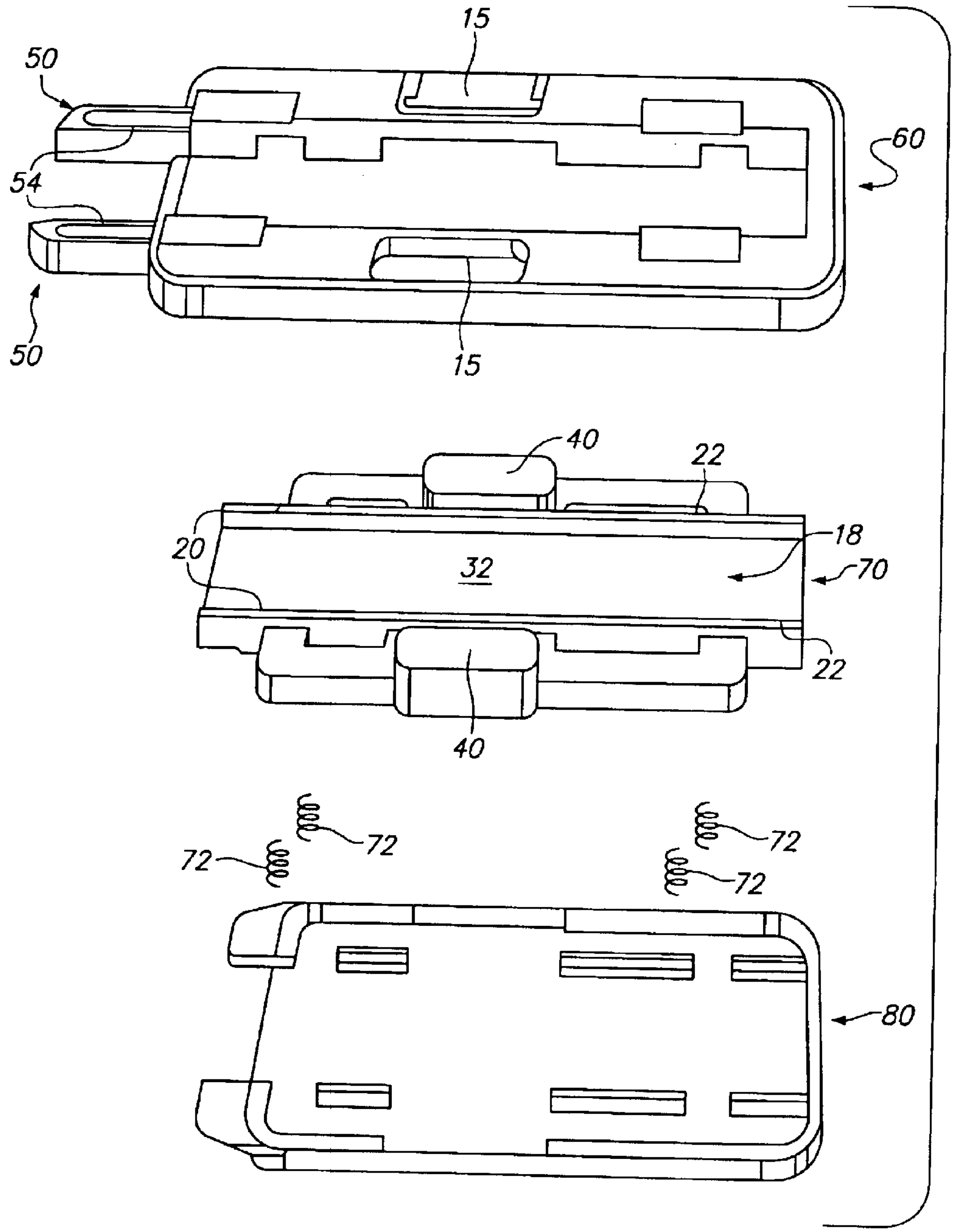
FIG. 9 is an exploded view of the holder of FIG. 1.
Figure 10:
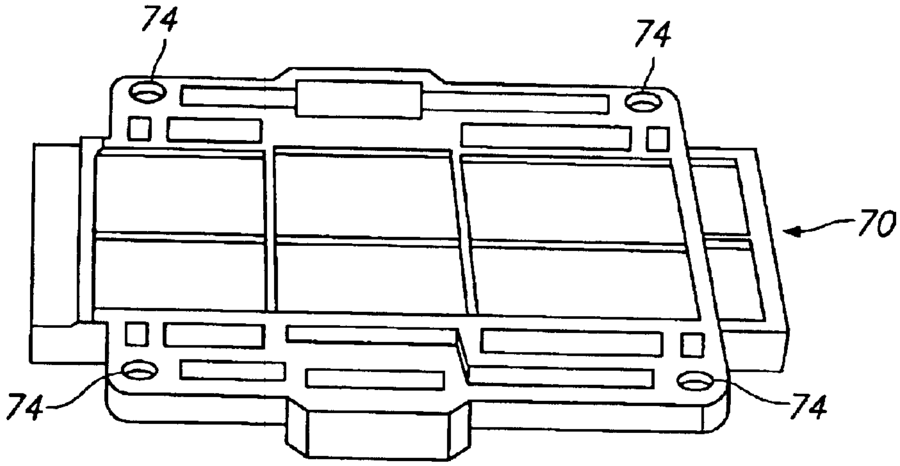
FIGS. 10 and 11 are more detailed view of some of the components shown in FIG. 8.

The holder 10 is preferably made in three molded sections from an opaque plastic, such as black ABS plastic (although other materials could be used), as illustrated in FIG. 9. In this manner a channel section 70 is interposed between a front section 60 and rear section 80. Rear and front views of channel section 70 are illustrated in more detail in FIGS. 9 and 10, respectively. Channel section is mounted to be free floating between sections 60, 80, with buttons 40 retained and movable forwardly and rearwardly within openings 15. The four springs 72 are retained in openings 74 in a rear side of channel section 70, as best seen in FIG. 10. For ease of manufacturing, sections 60 and 80 of the holder 10 are preferably ultrasonically welded together. Alternatives include adhesive bonding, solvent welding, molded-in snap fit joints and the use of fasteners such as screws. Springs 72 resiliently urge channel section 70 forward, and hence urge buttons 40 and channel 18 forward into the normal position. There is enough spring force behind to ensure that the slide will not move when loads of up to 30 times the force of gravity are applied to the channel in the rearward direction. The color of holder 10 is preferably black to minimize any fluorescent noise or signal contribution from holder 10. Also, holder 10 being opaque prevents any interrogating light from being scattered around inside the scanner. In this context, by the holder being "opaque" is referenced that it typically transmits less than 40%, and preferably less than 10% or 5%, and more preferably less than 2%, of an interrogating light.

It will be appreciated that both flexible and rigid slides may be used, provided such slide is not flexible as would prevent the clamp member sets from positioning the array in a known fixed position with reference to the holder. Preferred slide materials provide physical support for the deposited material and endure the conditions of the deposition process and of any subsequent treatment or handling or processing that may be encountered in the use of the particular array. The array substrate may take any of a variety of configurations ranging from simple to complex. In many embodiments, the slide will be shaped generally as a rectangular solid, having a length in the range about 5 mm to 100 cm, usually about 10 mm to 25 cm, more usually about 10 mm to 15 cm; a width in the range about 4 mm to 25 cm, usually about 4 mm to 10 cm and more usually about 5 mm to 5 cm; and a thickness in the range about 0.01 mm to 5.0 mm, usually from about 0.1 mm to 2 mm and more usually from about 0.2 to 1 mm.

In the present invention, any of a variety of geometries of arrays 112 on a slide 110 may be used, other than rectilinear rows and columns, when multiple arrays 112 are present. For example, such arrays can be arranged in a sequence of curvilinear rows across the substrate surface (for example, a sequence of concentric circles or semi-circles of spots), and the like. Similarly, the pattern of features 116 may be varied from the rectilinear rows and columns of spots in FIG. 2 to include, for example, a sequence of curvilinear rows across the substrate surface (for example, a sequence of concentric circles or semi-circles of spots), and the like. The configuration of the arrays and their features may be selected according to manufacturing, handling, and use considerations.

The slide may be fabricated from any of a variety of materials but is typically transparent. In this context, by "transparent" is referenced permitting the signal from features to pass therethrough without substantial attenuation and also permitting any interrogating radiation to pass therethrough without substantial attenuation. By "without substantial attenuation" may include, for example, without a loss of more than 40% or more preferably without a loss of more than 30%, 20% or 10%. The interrogating radiation and signal may for example be visible, ultraviolet or infrared light. In certain embodiments, such as for example where production of binding pair arrays for use in research and related applications is desired, the materials from which the substrate may be fabricated should ideally exhibit a low level of non-specific binding during hybridization events. Suitable rigid substrates may include: glass (which term is used to include silica) and suitable plastics. Should a front array location be used, additional rigid, non-transparent substrates may be considered, such as silicon, mirrored surfaces, opaque plastics, membranes and laminates.

The substrate surface onto which the polynucleotide compositions or other moieties is deposited may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated).

Various further modifications to the particular embodiments described above are, of course, possible. Accordingly, the present invention is not limited to the particular embodiments described in detail above.

What is claimed is:

1. A method of reading an array of moieties on at least a portion of a surface of a transparent slide which is opposite a first portion on an opposite surface, which array has been previously exposed to a sample, the method comprising:

(a) mounting the slide on a slide holder and retaining the slide thereon in a mounted position without the array contacting the holder, wherein the holder has:

a body having side portions and a channel intermediate the side portions and extending in a direction between ends of the body, and front and rear clamp member sets with members disposed about the channel, one set of which is fixed to the body side portions while the other set is movable to an open position away from the fixed set, and wherein the slide is retained in the mounted position by being urged against the fixed clamp member set; and (b) inserting the holder into an array reader and reading the array.

2. A method of reading an array of moieties on at least a portion of a rear surface of a transparent slide which is opposite a first portion on the front surface, which array has been previously exposed to a sample, the method comprising:

(a) mounting the slide on a slide holder and retaining the slide thereon in a mounted position in which the previously exposed array faces, and is spaced apart from, a backer member of the holder without the array contacting the holder, wherein the holder has:

a body having side portions and a channel intermediate the side portions and extending in a direction between ends of the body, the backer member comprising a bottom surface of the channel, and front and rear clamp member sets with members disposed about the channel, one set of which is fixed to the body side portions while the other set is movable to an open position away from the fixed set, and wherein the slide is retained in the mounted position by being urged against the fixed clamp member set; and (b) inserting the holder into an array reader and reading the array.

3. A method of reading an array of moieties on at least a portion of a rear surface of a transparent slide which is opposite a first portion on the front surface, which array has been previously exposed to a sample, the method comprising:

(a) mounting the slide on a slide holder and retaining the slide thereon in a mounted position in which the previously exposed array faces, and is spaced apart from, a backer member of the holder without the array contacting the holder, wherein the holder has a body having a channel with a closed end, wherein the backer member comprises a bottom surface of the channel, and wherein the mounting of the slide on the holder comprises sliding the slide in an endways direction of the channel and into the mounted position in which a leading end of the slide abuts the closed end of the channel; and (b) inserting the holder into an array reader and reading the array.

* * * * *